United States Patent
Uematsu (10) Patent No.: US 8,192,620 B2
(45) Date of Patent: Jun. 5, 2012

(54) BALLAST WATER TREATING APPARATUS

(75) Inventor: Hideto Uematsu, Saitama (JP)

(73) Assignees: OHR Laboratory Corporation, Saitama (JP); Hideto Uematsu, Saitama (JP)

( * ) Notice: Subject to any disclaimer, the term of this patent is extended or adjusted under 35 U.S.C. 154(b) by 232 days.

(21) Appl. No.: 11/993,448

(22) PCT Filed: Jun. 20, 2005

(86) PCT No.: PCT/JP2005/011295
§ 371 (c)(1),
(2), (4) Date: Jul. 27, 2009

(87) PCT Pub. No.: WO2006/137121
PCT Pub. Date: Dec. 28, 2006

(65) Prior Publication Data
US 2010/0032354 A1 Feb. 11, 2010

(51) Int. Cl.
*C02F 1/72* (2006.01)
*C02F 1/78* (2006.01)

(52) U.S. Cl. ............ 210/192; 210/198.1; 210/219; 210/242.1; 366/167.1; 366/163.2; 366/337

(58) Field of Classification Search .......... 210/760, 210/192, 198.1, 219, 759, 764, 242.1; 366/337, 366/167.1, 163.2, 174.1, 175.2, 176.1, 181.5, 366/340; 422/225, 228, 229
See application file for complete search history.

(56) References Cited

U.S. PATENT DOCUMENTS

| | | | | |
|---|---|---|---|---|
| 4,210,166 A | * | 7/1980 | Munie | 366/160.2 |
| 5,474,749 A | | 12/1995 | Takeda | |
| 5,863,128 A | * | 1/1999 | Mazzei | 366/163.2 |
| 5,865,537 A | * | 2/1999 | Streiff et al. | 366/337 |
| 5,888,403 A | * | 3/1999 | Hayashi | 210/192 |

(Continued)

FOREIGN PATENT DOCUMENTS

JP 5378673 6/1978

(Continued)

OTHER PUBLICATIONS

Right Triangle and Side Calculator Output. Input based on data in 5,863,128 to Mazzei, www.csgnetwork.com/righttricalc.html (obtained Oct. 2010).*

*Primary Examiner* — Joseph Drodge
*Assistant Examiner* — Lucas Stelling
(74) *Attorney, Agent, or Firm* — Lowe Hauptman Ham & Berner, LLP (57) ABSTRACT

A ballast-water treating apparatus that improves the performance of an in-line mixer so as to be able to sterilize a large volume of ballast water within a short period of time. There is provided a ballast-water treating apparatus that includes pipelines for feeding water to a ship's ballast tank(s) and for draining water from the ballast tank(s), ballast pumps on the pipelines, an ozone generator or hydrogen peroxide generator, a gas/liquid injection pipe for introducing generated ozone or hydrogen peroxide into the pipelines; and an in-line mixer that has two blades disposed crosswise in a tubular part composed of a main tubular part, a subsidiary tubular part that has an inside diameter smaller than that of the main tubular part and that is furnished with multiple projections, and a tapered part. The ballast-water treating apparatus can simultaneously carry out mechanical destructive sterilization via a swirling flow and sterilization of chemically active substances by micromixing.

5 Claims, 6 Drawing Sheets

U.S. PATENT DOCUMENTS

| | | | |
|---|---|---|---|
| 6,200,486 B1 * | 3/2001 | Chahine et al. | 210/764 |
| 6,730,214 B2 * | 5/2004 | Mazzei | 210/188 |
| 6,830,370 B1 | 12/2004 | Uematsu | |
| 2003/0015481 A1 * | 1/2003 | Eidem | 210/760 |

FOREIGN PATENT DOCUMENTS

| | | |
|---|---|---|
| JP | 192300 | 6/1989 |
| JP | 7124577 | 5/1995 |
| JP | 7185529 | 7/1995 |
| JP | 9150044 | 6/1997 |
| JP | 2000167575 | 6/2000 |
| JP | 2000354749 | 12/2000 |
| JP | 2002126729 | 5/2002 |
| JP | 2002192161 | 7/2002 |
| JP | 2002331299 | 11/2002 |
| JP | 2005088835 | 4/2004 |
| JP | 2004160437 | 6/2004 |
| JP | 200404188240 | 7/2004 |

* cited by examiner

Left ⟵⟶ Right

(a) Artemia

Before → After (b) Brachionus

Before → After

BALLAST WATER TREATING APPARATUS

CROSS-REFERENCE TO RELATED APPLICATIONS

The present Application is based on International Application No. PCT/JP2005/011295 filed on Jun. 20, 2005 and priority is hereby claimed under 35 USC §119 based on this application. This application is hereby incorporated by reference in its entirety into the present application.

FIELD OF THE INVENTION

The present invention relates to a ballast-water treating apparatus, and more particularly, to a ballast-water treating apparatus that can sterilize microorganisms in ballast water when the ballast water is obtained by pumping seawater into a ballast tank of a ship, or when the ballast water is discharged from a ship's ballast tank into the sea.

BACKGROUND OF THE INVENTION

Normally, seawater is used for ballast water and, as a result, a large amount of bacteria and microorganisms living in the sea are present in the seawater used as the ballast water. When this ballast water is discharged into the seawater at a different location such as a ship's destination, a large amount of normative microorganisms are discharged in the seawater at that destination, which adversely impacts the ecological system in that area.

One method to prevent such adverse impact on the ecological system is—while a ship is at sea during its voyage—to exchange the ballast water with seawater that contains relatively few bacteria and microorganisms. But this method, in which the ballast tank is emptied and then seawater is pumped thereinto, also can cause problems, including danger due to the instability of the ship and difficulty of doing that pumping in bad weather.

Another method, in which new seawater is pumped into the ballast tank so that old seawater is drained out of the ballast tank, is difficult to implement because the amount of seawater required for exchanging 95% or more of the ballast water is about three times as large as a capacity of the ballast tank. For instance, if a ballast tank has a capacity of 60,000 tons, it is necessary to pump 180,000 tons of seawater into the tank to replace the old seawater with new seawater.

In February 2004, the International Maritime Organization (IMO) adopted the International Convention for the Control and Management of Ships' Ballast Water and Sediments. The purpose of this international convention is to ensure the protection of oceanic ecosystems and smooth international marine transport and, through the control and management of ships' ballast water and sediments, to protect the environment, human health, property, and resources from damage caused by the transfer of harmful aquatic organisms and pathogens.

The ballast-water performance standards are as follows:
Zooplankton—less than 10 viable organisms per cubic meter
Phytoplankton—less than 10 viable organisms per milliliter (ml)
Toxicogenic *Vibrio cholerae*—less than 1 colony-forming unit (cfu) per 100 ml
*Escherichia coli*—less than 250 cfu per 100 ml
Intestinal Enterococci—less than 100 cfu per 100 ml
In addition to the above-described methods for replacing ballast water while at sea, there is a method for sterilizing ballast water through arc-electric discharge by applying a high-voltage pulse when the ballast water is sucked into or discharged from a ballast tank (see Patent Document 1).

Other methods include using the steam heat of a boiler, using the DNA destructive action of ultraviolet rays, and using ozone to effect oxidative decomposition of cell membranes (see Patent Document 2).

The applicant of the invention of the current application has previously proposed a fluid-mixing apparatus that efficiently mixes two fluids such as a gas and a liquid by causing a swirling flow in a fluid passing through a pipe so as to cause cavitation (see Patent Document 3), and an ozone-reaction apparatus that uses ozone for purification (see Patent Document 4). This fluid-mixing apparatus, which is also referred to as an in-line mixer, can sterilize a large amount of ballast water in a short time, and so it has been used in various experiments.

According to these experiments, the in-line mixer is effective at sterilizing ballast water because it can destroy the cell membranes of planktons by the combined effect of three actions, i.e., (1) pressurization by the swirling flow that presses the ballast water against the inside surface of a pipe, (2) collisions achieved by causing the swirling flow of the ballast water to crash against a multiplicity of projections that are formed on the inside surface of a pipe, and (3) shock waves due to cavitation. Such shock waves are generated as follows. A cavity generated at a center of the swirling flow of the ballast water is under low pressure; therefore, bubbles form, and when the bubbles grow to sufficient size they burst due to the higher pressure of the ballast water surrounding the cavity. This dynamical action is effective for sterilizing planktons and larva of tens to hundreds of microns in size. To better assure the desired effect, an in-line mixer that can cause a faster swirling flow is sought.

These experiments have shown that the dynamical action of the in-line mixer is not capable of sterilizing cholera *bacillus* and *E. coli*, because the sizes of the cholera *bacillus* and *E. coli*, which are 1 micron to 5 microns in size, are too fine to sterilize. Therefore, sterilization must rely on contact between a bactericide and those bacteria, and ozone-sterilization having a sterilization action seven times as great as that of chlorine is desired. To this end, it is necessary to instantaneously achieve mixing of a gas (bactericide) and liquid (ballast water), or micromixing of two liquids (bactericide and ballast water).

Although the in-line mixer is excellent in such mixing ability, further improvement of mixing performance is sought in order to surely sterilize microorganisms in the ballast water.

Patent Document 1: Japanese Unexamined Patent Application Publication No. 2002-192161
Patent Document 2: Japanese Unexamined Patent Application Publication No. 2004-160437
Patent Document 2: Japanese Unexamined Patent Application Publication No. 2000-354749
Patent Document 2: Japanese Unexamined Patent Application Publication No. Heisei 7 (1995)-124577

DISCLOSURE OF THE INVENTION

Problem to Be Solved by the Invention

One object of the present invention is to provide a ballast-water treating apparatus that has an improved-performance in-line mixer that can sterilize microorganisms that are tens of microns to hundreds of microns in size, and that can thereby treat a large amount of ballast water in a short time.

Means for Solving the Problems

The ballast-water treating apparatus according to the present invention consists of
a pipeline for supplying water to a ballast tank of a ship and for discharging water from the ballast tank,
a ballast pump installed on said pipeline for supplying and discharging the ballast water,
an ozone generator or a hydrogen peroxide generator,
a gas/liquid injection pipe for delivering the generated ozone or hydrogen peroxide into said pipeline, and
an in-line mixer that includes (1) a main tubular part that has a predetermined inside diameter, (2) a subsidiary tubular part that (a) has an inside diameter smaller than that of said main tubular part, and (b) has multiple projections on its inside surface, (3) a tapered part that connects the inside surfaces of the two tubular parts, and (4) two blades for causing a swirling flow inside the tubular parts.

The apparatus is characterized such that it can simultaneously perform
dynamical destructive sterilization, which is achieved by the three actions of (1) pressurization of the ballast water, (2) collision of said ballast water with the aforementioned projections against the inside surface of a pipe, and (3) cavitation shock waves, which is achieved by passing said ballast water through said in-line mixer, and
chemical active substance sterilization by micromixing ozone or hydrogen peroxide with the ballast water.

It is preferable that the following is connected to portions of said in-line mixer that face said subsidiary tubular part on one end of said main tubular part:
a vane seat on which are formed a through-hole whose inside diameter is the same as that of said subsidiary tubular part and said tapered part that connects the inner periphery of said main tubular part with said through-hole.

In said in-line mixer, it also is preferable that
said blades are arranged at said tapered part,
the crossing angle formed by said two blades is a right angle, and
the oblique angle of said tapered part is formed to be one-fourth of said crossing angle.

ADVANTAGEOUS EFFECTS OF THE INVENTION

In the ballast-water treating apparatus of claim 1 of the present invention, the following is possible.
(1) Sterilization can be realized both when ballast water is stored in the ballast tank of the ship and when ballast water is being discharged from the ballast tank into the sea.
(2) Because an in-line mixer is used, the ballast water needs only to be passed through the apparatus, and a large amount of water can be sterilized in a short time. For example, when the water-feeding pressure is 3.8 kgf/$cm^2$ (cf., tap water in Japan has an emission pressure of 2 kg-3 kgf/$cm^2$), an in-line mixer that has an intake-side pipe diameter of 250 mm and a discharge-side pipe diameter of 200 mm can treat ballast water at a rate of 900 $m^3$/h.

(3) Because the main tubular part is connected with the subsidiary tubular part via the tapered part, and the inside diameter of the subsidiary tubular part is smaller than that of the main tubular part, a faster than usual swirling flow can be obtained.
This can improve dynamical sterilization ability by pressurization of the ballast water, by collision of the ballast water with the aforementioned projections, and by cavitation shock waves.
(4) At the same time, the high-speed swirling flow can also improve the mixing of the ballast water with ozone or hydrogen peroxide, and, as a result, chemical sterilization ability also can be improved.

In the in-line mixer of claim 2 of the present invention, the through-hole of the vane seat is in effect an extension from the subsidiary tubular part, which means that the blades arranged in the through-hole are arranged at the subsidiary tubular part. Accordingly, the flow rate of the ballast water is accelerated and is fast, so that a strong swirling flow can be generated. Because the tapered part is formed at the vane seat, there is no need to form a tapered part on the main tubular part, which is an advantage in manufacturing. Also, the angle of the tapered part can be set to an arbitrary angle in processing the vane seat.

In the in-line mixer of claim 3 of the present invention, the blades are arranged at the tapered part, and the crossing angle of the blades is a right angle, i.e., 90 degrees. Also, the oblique angle of the tapered part is one-fourth of 90 degrees, i.e., 22.5 degrees. Therefore, resistance of the ballast water can be restrained, and a strong swirling flow can be generated. Also, the ballast water can be fed to the subsidiary tubular part, using the ballast water as if it were a sharp-tipped screw.

EXPLANATIONS OF NUMBERS USED IN THE DRAWINGS 1 ship
2 ballast tank
3 ballast pumps
6 in-line mixer 7 ozone generator or hydrogen peroxide generator
10 pipelines for water feeding and drainage
10a, 10b water-feeding pipes (feed-water)
10c, 10d drainpipes
10e common pipes
20, 21, 22, 23, 24 valves
25 gas/liquid injection pipe
30 main tubular part
31 subsidiary tubular part
32 flanges
33 connection opening
34 tapered part
35 mushroom-shaped protrusion
36 blade
36a, 36b blades
37 periphery curves of blade (ellipse)
40 cavity
41 heavy-fluid layer
42 light-fluid layer
45 concave part
46 vane seat
47 through-hole
50 oblique angle of tapered part
51 oblique angle of blade
52 crossing angle
53 oblique angle (65°)
54 oblique angle (45°)
60, 61, 62, 63, 64 directions of flow

BEST MODES FOR CARRYING OUT THE INVENTION

Figure 1:
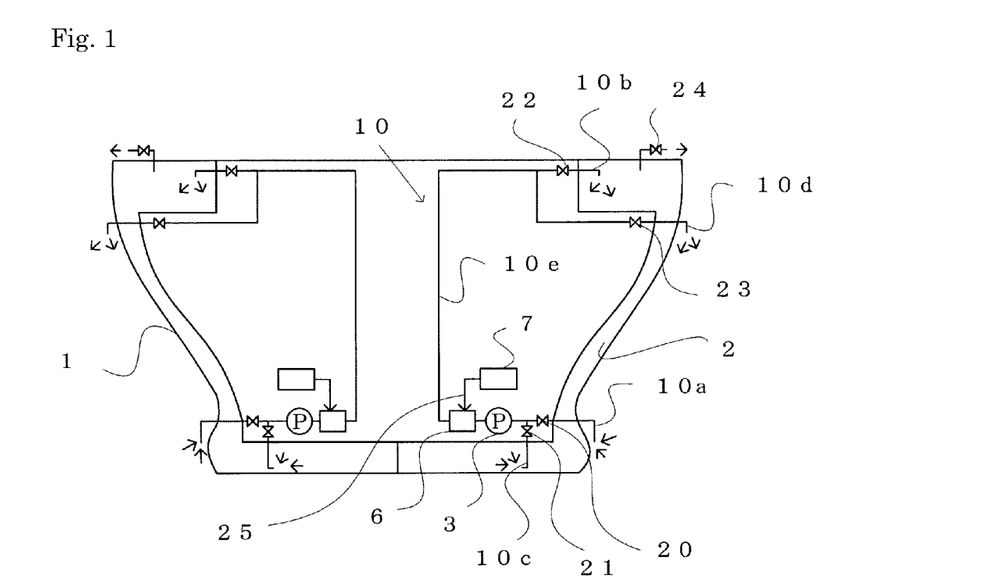
FIG. 1 shows the configuration of the ballast-water sterilization system according to a first embodiment of the present invention.

Embodiments of the present invention will be explained in detail as follows, with reference to accompanied drawings.
First Embodiment FIG. 1 shows the configuration of a ship's ballast-water sterilization system. The ship 1 is a double-hull type, having double sides and a double bottom that form a ballast tank 2. The ballast tank 2 is referred to as a top tank, a bilge tank, and a bottom tank, when viewed from the side, and is partitioned into right and left portions based on the center of the ship's bottom. A pipeline 10 for supplying water into, and discharging ballast water from, the ballast tank 2 has two routes. Here, the right-side portion of FIG. 1 is referred to. When the ballast water is supplied to the ballast tank 2, the ballast pump 3 opens valves 20 and 22, closes valves 21 and 23, opens valve 24 so that the air or the spilled ballast water in the ballast tank 2 is released to the outside, pumps seawater from the sea via the outside end of the pipe 10a, sterilizes it with the in-line mixer 6, and supplies the ballast water to the top of the ballast tank 2 through the pipes 10e and 10b. When the ballast water is discharged from the ballast tank 2, the pump opens valves 21 and 23, closes valves 20 and 22, sucks the ballast water at the bottom of the ballast tank 2 from the in-tank end of the pipe 10c, sterilizes it with the in-line mixer 6, and discharges it from the ship into the sea through the pipes 10e and 10d. The ozone or hydrogen peroxide generated by the ozone generator or the hydrogen peroxide generator 7 is supplied to the in-line mixer 6 by the gas/liquid injection pipe 25.

Many high-voltage discharge tubes are disposed inside the ozone generator, and oxygen taken from the air is blown through the tubes so as to generate ozone. Ozone is denoted as $O_3$, and it has a strong oxidative decomposition action due to OH radicals. It also has strong bactericidal capacity, deodorizing power, and bleaching power. Oxygen in the air is used as the raw material for generating ozone, and so operating costs are low. Also, ozone does not have any residual toxicity. The in-line mixer 6 is suitable for micromixing the ballast water and the gas (i.e., ozone).

The hydrogen peroxide generator is a device for producing a hydrogen peroxide liquid. Hydrogen peroxide is denoted as $H_2O_2$, and it has a sterilization action for oxidatively decomposing organic substances. Oxydol having a hydrogen peroxide concentration of 3% is known to be an antiseptic substance. Hydrogen peroxide is produced by electrolysis using, for example, soft water or seawater as an electrolyte, and air as a raw material. It chemically reacts is to obtain $H_2O_2$ from $1/2O_2$ and $H_2O$.

Figure 2:
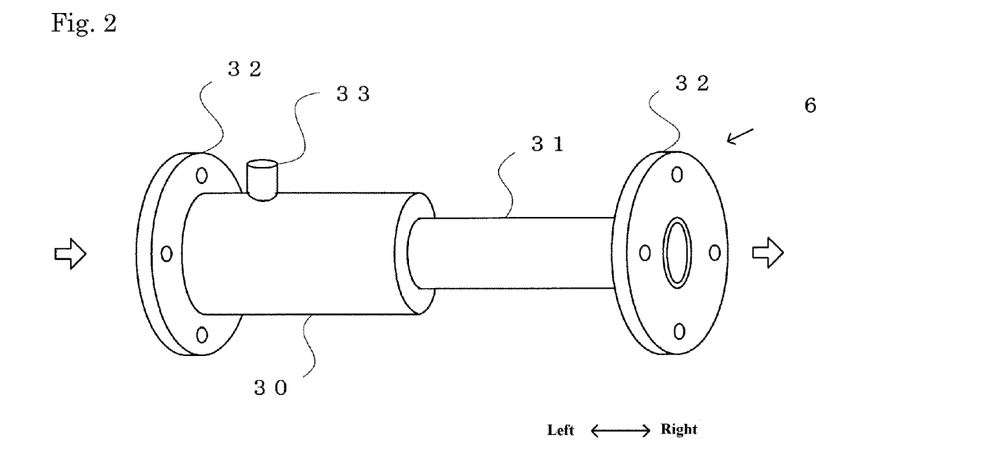
FIG. 2 is a perspective view of an in-line mixer according to the present invention.

FIG. 2 is a perspective view of the in-line mixer. The in-line mixer 6 is a tube that consists of a main tubular part 30 and a subsidiary tubular part 31 that has a diameter smaller than that of the main tubular part 30. A tapered part is provided between the main tubular part 30 and the subsidiary tubular part 31. If the diameter of the entire tube is the same throughout, the flow rate in the tube becomes lower because of resistance as the water goes from left to right (in FIG. 2). Therefore, the inside diameter of the subsidiary tubular part 31 is made smaller than the inside diameter of the main tubular part 30, so as to reduce the resistance and thereby maintain a high flow rate. The ballast water flows from the left side, is sterilized, and is discharged from the subsidiary tubular part 31 on the right side. Flanges 32, which facilitate piping connections, are provided on the right and left ends of the in-line mixer 6. Also, the main tubular part 30 is provided with a connection opening 33 for linking the in-line mixer 6 with a gas/liquid injection pipe 25 that extends from a bactericidal substance generator.

Figure 3:
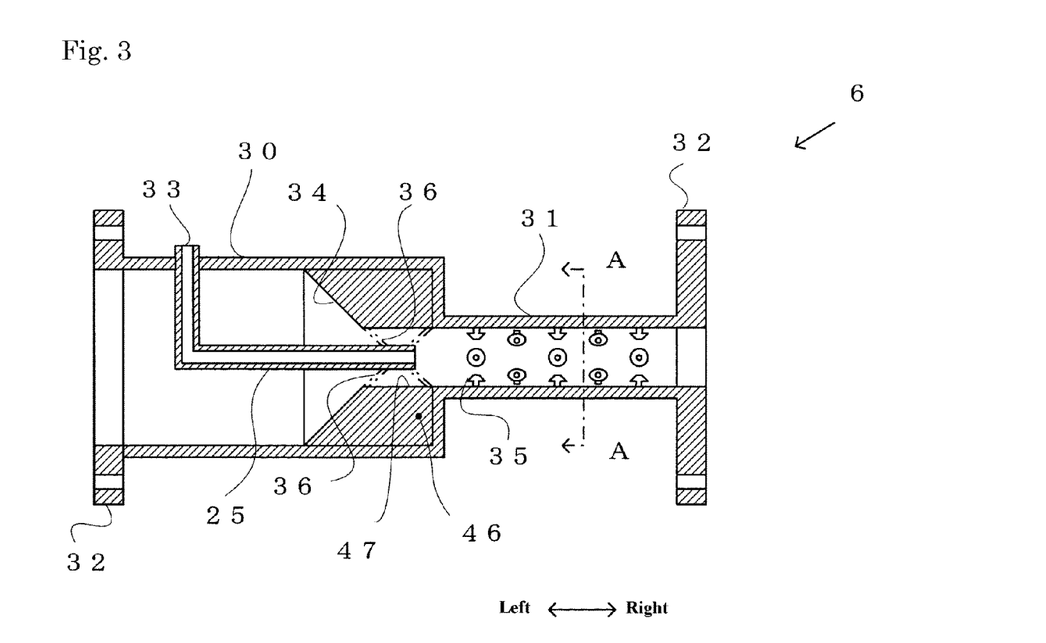
FIG. 3 is a cross-sectional view of the in-line mixer shown in FIG. 2.

FIG. 3 is a cross-sectional view of the in-line mixer shown in FIG. 2. As shown in FIG. 3, a vane seat 46 is installed between the main tubular part 30 and the subsidiary tubular part 31 of the in-line mixer 6. At the center of the vane seat 46 is a through-hole 47—which has an inside diameter identical to that of the subsidiary tubular part 31—and a tapered part 34. Blades 36 for producing a swirling flow are mounted in the through-hole 47 of the vane seat 46. Mushroom-shaped projections 35 are mounted on the inner periphery of the subsidiary tubular part 31. Also, one end of the gas/liquid injection pipe 25 is mounted in such a way as to allow that end to open to the subsidiary tubular part 31 through the center of the blades 36. The other end of the gas/liquid injection pipe 25 projects to the outside from the side wall of the main tubular part 30, and serves as an opening for the connection opening 33. The connection opening 33 of the gas/liquid injection pipe is part of the in-line mixer 6, and therefore, there is no need for specially providing an insertion part at the front or the back of the ballast pump. Also, ozone or hydrogen peroxide is directly fed to a low-pressure part having a negative pressure proportional to the square of the rate of a swirling flow, so that said ozone or hydrogen can be easily and sufficiently provided. The in-line mixer 6 has, for example, a length of about 1 m, an inside diameter of 200 mm on its suction side, and an inside diameter of 100 mm on its discharge side.

Figure 4:
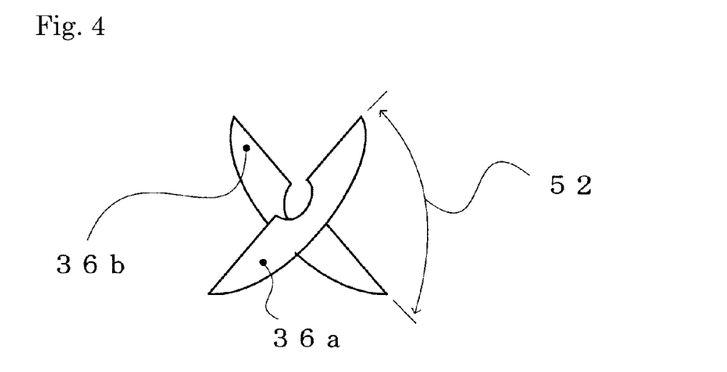
FIG. 4 is a perspective view of the arrangement of the two blades shown in FIG. 3.

FIG. 4 is a perspective view showing the arrangement of the two blades. The crossing angle 52 of blades 36a and 36b is 90 degrees. If the crossing angle is made smaller than 90 degrees, the cycle of a swirling flow is elongated. If the crossing angle is made larger than 90 degrees, flow resistance increases, and so the water does not flow as quickly or smoothly. The ballast water entering from the left side of the blades 36a and 36b shown in FIG. 4 is swirled by those blades and pushed into the subsidiary tubular part 31. The flow entering horizontally from the lower-left front side collides with the blade 36a, is raised to the upper-right side of FIG. 4, and is made to go in the upper tip direction of the blade 36b. The amount of the ballast water that is passed is limited by the blades. The area through which the ballast water can pass is approximately triangular above and below the crossing point of the blades 36a and 36b, which corresponds to about one-half of the cross-sectional area of the through-hole.

Figure 5:
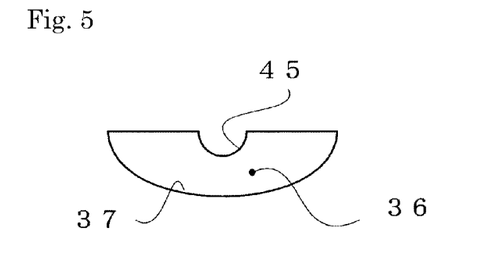
FIG. 5 is a plane view of a blade shown in FIG. 3.

FIG. 5 is a plane view of one blade. The blade 36 has a half-oval shape. The semicircular concave 45 is a portion through which passes the gas/liquid injection pipe 25 for providing a bactericidal substance. The outer peripheral curve 37 of the blade 36 has an oval shape. If the through-hole 47 is regarded as a cylindrical column, and if this cylindrical column is cut on a plane that is not parallel to the bottom face of the column, the curve formed by the cross-section is an oval.

Figure 6:
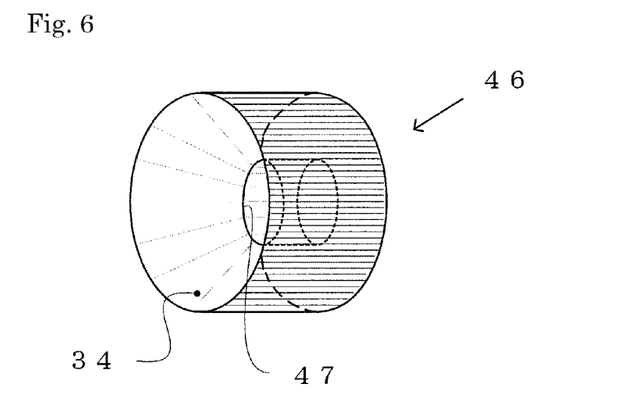
FIG. 6 is a perspective figure view of the vane seat shown in FIG. 3.

FIG. 6 is a perspective view of the vane seat. The outside diameter of the vane seat 46 is identical to the inside diameter of the main tubular part 30. The diameter of the through-hole 47 is identical to the inside diameter of the subsidiary tubular part 31. Here, the angle of the tapered part 34 is 45 degrees. However, the angle is not limited to that degree, and therefore, the angle of the tapered part 34 can be 30 degrees or more or less than that. If the angle is made small, the vane seat 46 lengthens. As a result, the length of the main tubular part 30 also lengthens, but the flow resistance can be made small, which reduces the burden on the ballast pump 3.

Figure 7:
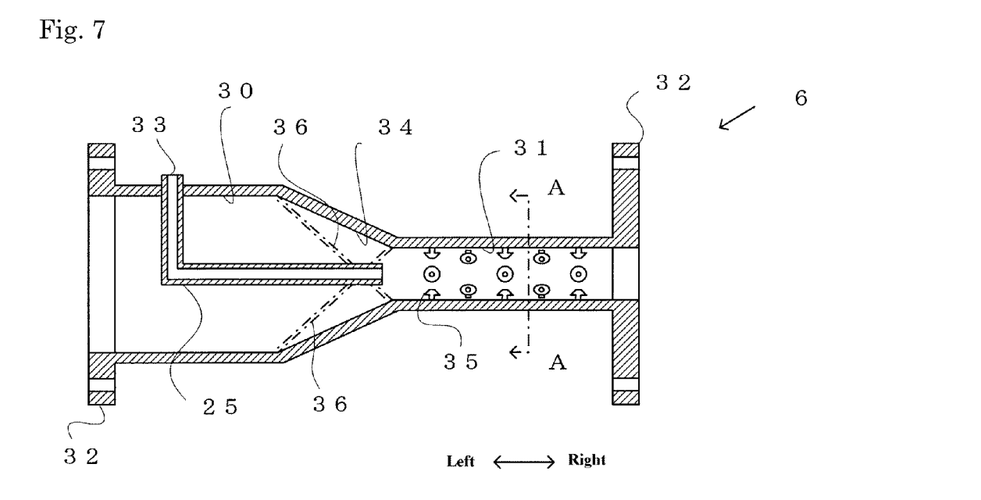
FIG. 7 is a cross-section view of the in-line mixer, which adopts the configuration different from that shown in FIG. 3.

FIG. 7 is a cross-section view of an in-line mixer 6 that has a configuration different from that shown in FIG. 3. Although the inner configuration is different, reference numbers identical to those in FIG. 2 are used in FIG. 7. The in-line mixer 6 consists of a main tubular part 30 and a subsidiary tubular part 31 that has a diameter smaller than that of the main tubular part, and a tapered part 34 is provided between the main tubular part 30 and the subsidiary tubular part 31. The tapered part 34 is formed by directly processing a tube, and it can be provided with a vane seat similar to that in the configuration shown in FIG. 3.

As shown in FIG. 7, the blades 36 are mounted to the tapered part 34, rather than to the subsidiary tubular part 31. The blades 36 in such an arrangement are larger than when the blades 36 are arranged in the subsidiary tubular part 31, and therefore, the burden on the ballast pump 3 is smaller. (The larger the blades 36 become, the more the performance of the in-line mixer 6 is improved.)

Figure 8:
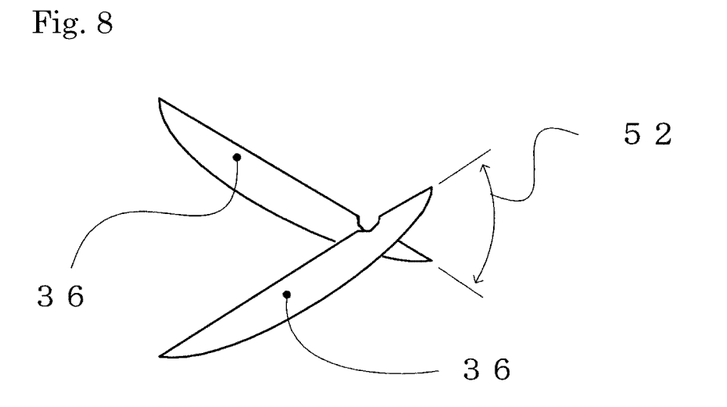
FIG. 8 is a perspective view of the arrangement of the two blades shown in FIG. 7.

FIG. 8 is a perspective view showing the arrangement of the two blades shown in FIG. 7. The crossing angle 52 of the two blades 26 is 90 degrees. As shown in FIG. 8, the left side of the blades 36 is longer than the right side, centering on the portions that nip the gas/liquid injection pipe 25. Therefore, the blades are bilaterally asymmetrical.

Figure 9:
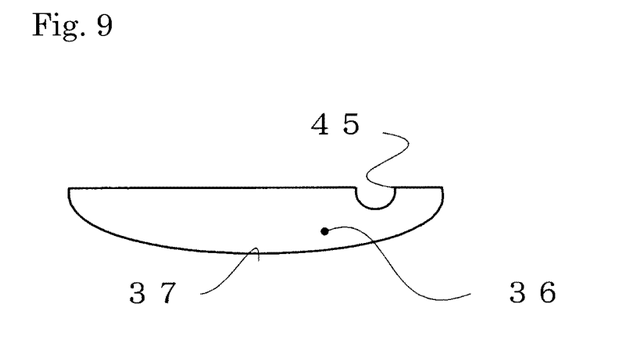
FIG. 9 is a plane view of a blade shown in FIG. 7.

FIG. 9 is a plane view of the blades 36 shown in FIG. 7. As shown in FIG. 7, the blades 36 are mounted to the tapered part 34, and the left sides of the blade 36 shown in FIG. 7 are formed longer than those of the blades 36 shown in FIG. 4.

Also, the blade 36 here includes a semicircular concave 45 that is for nipping the gas/liquid injection pipe 25 that provides a bactericidal substance. The outer peripheral curve 37 of the blade 36 also is oval. If the tapered part 34 is regarded as a cone and is cut on a plane not parallel to the bottom face of the cone, the shape formed by the cross-section of the cut is an oval.

Figure 10:
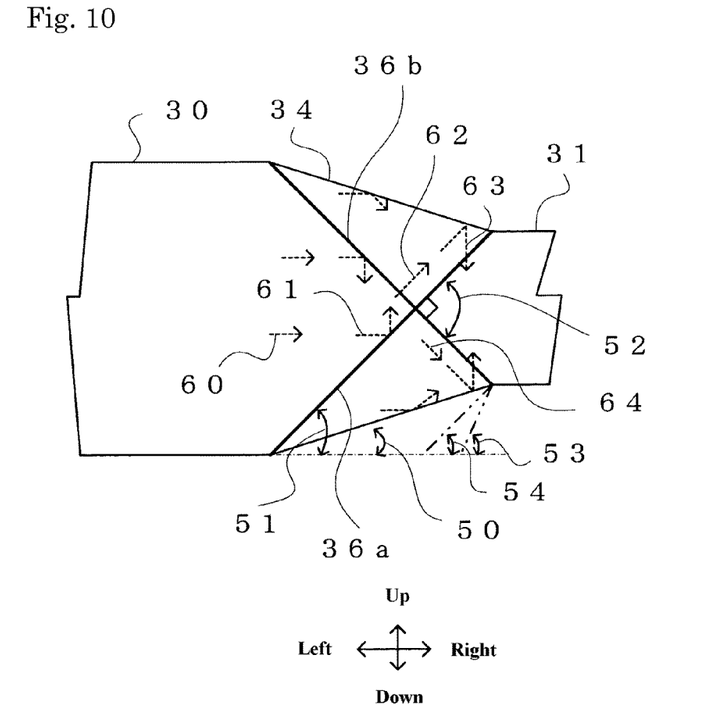
FIG. 10 is a pattern diagram of ballast-water flow in the in-line mixer shown in FIG. 7.

FIG. 10 is a pattern diagram showing the flow of ballast water of the in-line mixer shown in FIG. 7. Because the crossing angle 52 of the blades 36a and 36b is 90 degrees, the oblique angle 51 formed by the blade 36a in the axial-line direction is 45 degrees. The oblique angle 50 of the tapered part 34 is one-half of the oblique angle 51, i.e., 22.5 degrees, which is one-fourth of 90 degrees. In this arrangement, when a horizontal flow 60 collides with the blade 36a, it is directed upward like a flow 61, but it does not flow in the direction opposed to the flow from left to right. When a flow 62 that is directed diagonally upward by the blade 36a collides with the tapered part 34, it becomes a downward-directed flow 63, but it does not flow in a direction opposed to the flow from left to right. If there is no reverse flow, the water can flow more easily. This also applies to the blade 36b. As shown in the lower-right part of FIG. 10, if the oblique angle of the tapered part 34 is 65 degrees, like the oblique angle 53, or is 45 degrees, like the oblique angle 54. Then if the flow 64 collides with the tapered part, the flow is directed to the left, which leads to a reverse flow. That is to say, the water does not flow smoothly.

As shown in FIG. 10, the amount of the ballast flow that passes is limited by the blades. The area through which the ballast water can pass is the area shown by right triangles above and below the crossing point of the blades 36 of FIG. 10 (the area of the gas/liquid injection pipe is not shown), which is larger than the areas formed above and below the crossing point of the blades 36 shown in FIG. 3. Therefore, the passing flow rate is larger than that of the arrangement shown in FIG. 3. Also, if the blades 36 are arranged on the main tubular part 30, rather than on the tapered part 34, the burden on the ballast pump becomes even smaller. However, by the time the flow reaches the subsidiary tubular part 31, the force of the swirling flow becomes smaller.

Figure 11:
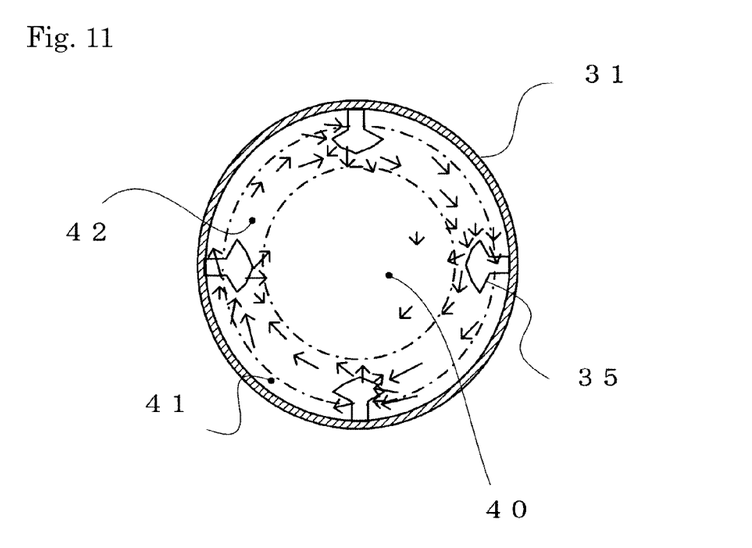
FIG. 11 is a diagram of the swirling flow at the subsidiary tubular part in the in-line mixer shown in FIG. 3 or FIG. 7.

FIG. 11 is an action view showing the swirling flow in the subsidiary tubular part of the in-line mixer 6. FIG. 11 is a cross-section taken along the line A-A of FIG. 3 or FIG. 7 and seen in the direction of the arrows. The ballast water flowing in the main tubular part 30 is made into a swirling flow by the blades 36, and it then enters the subsidiary tubular part 32. Here, a heavy-fluid layer 41 is pressurized to the outside by a strong centrifugal force due to the swirling flow, and a light-fluid layer 42 is moved inside. Then, the central portion along the central axis of the subsidiary tubular part 31 becomes a cavity 40, so as to create a low-pressure condition. The swirling flow collides with the mushroom-shaped projections 35, and the ballast water is smashed into a group of superfine particles. Due to said low pressure, the ozone or hydrogen peroxide that enters from the gas/liquid injection pipe 25 of the main tubular part 30 is drawn into the cavity 40, where it is mixed with the ballast water, after which the mixture is dispersed as fine particles. Also, because the cavity 40 is under low pressure, bubbles in the ballast water or the bubbles in ozone air expand. The bubbles collide with the mushroom-shaped projections 35 and are ruptured, and thereby cavitation shock waves due to the bubbles (cavities) are generated. The shock waves can destroy the cell membranes of plankton and other entities. It is recognized that ultrasonic waves of 40 kHz or more are generated at the subsidiary tubular part 31, which further promotes the generation of bubbles.

Figure 12:
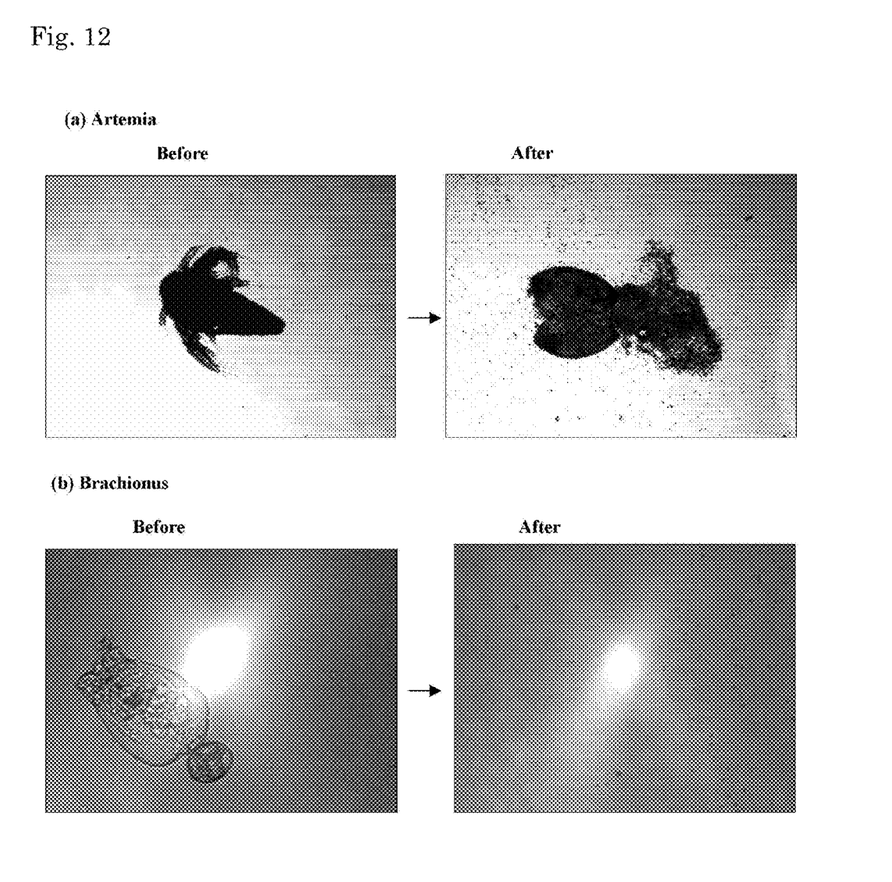
FIG. 12 consists of before-and-after photomicrographs of destroyed microorganisms destroyed by the in-line mixer; (a) is an example of Artemia, (b) is an example of Brachionus.

It is difficult for such a reaction to have an influence on, for example, the inside of the shell of a crab. Therefore, in FIG. 1, when seawater is pumped into the system, it is preferable that a filter for eliminating large solid objects be provided on the pipeline. Incidentally, smashed pieces of microorganisms, or the condition where the cell membranes are destroyed, can be confirmed by using a microscope. FIG. 12 shows photographs of microorganisms in ballast water that have been destroyed after passing through the in-line mixer once. FIG. 12(a) shows a destroyed cell membrane of an Artemia. As shown in the photograph taken after treatment, the cell membrane on the left side of the Artemia has been ruptured. FIG. 12(b) shows an example where a Brachionus has been smashed into pieces. The white portion at the center is a light from a backlight. As shown in the photograph after treatment, the smashed pieces of the Brachionus are floating.

INDUSTRIAL APPLICABILITY

The present invention is suitable as a ballast-water treating apparatus of a ship because it can sterilize a large amount of ballast water in a short time.

What is claimed is:

1. A ballast-water treating apparatus comprising:
a pipeline for supplying water to a ballast tank of a ship and for discharging water from the ballast tank,
a ballast pump installed on said pipeline for supplying and discharging ballast water,
an ozone generator or a hydrogen peroxide generator,
a gas/liquid injection pipe for delivering the generated ozone or hydrogen peroxide into said pipeline, and
an in-line mixer that includes
  (1) a main tubular part that has a predetermined inside diameter,
  (2) a subsidiary tubular part that (a) has an inside diameter that is smaller than that of said main tubular part and an outside diameter that is smaller than that of said main tubular part, (b) is directly connected to a circular plate at one end of said main tubular part, and (c) has multiple projections on the inside surface,
  (3) a vane seat, which is mounted in said main tubular part, and which comprises
    (a) a through-hole, wherein the inside diameter of the through-hole is equal to the inside diameter of said subsidiary tubular part, and a length of the through-hole is predetermined, and
    (b) a tapered part, which connects said inside diameter of said main tubular part to said inside diameter of said through-hole so as to maintain a high flow rate of said water, which has an oblique angle of 45 degrees, and
  (4) two blades that are mounted on said gas/liquid injection pipe being inserted into said vane seat, and that are placed inside said through-hole.

2. The ballast-water treating apparatus according to claim 1, wherein the tapered part of the vane seat is directly against the circular plate.

3. The ballast-water treating apparatus according to claim 1, wherein the circular plate extends inwardly toward the gas/liquid injection pipe.

4. The ballast-water treating apparatus according to claim 1, wherein the two blades are located in the main tubular part.

5. The ballast-water treating apparatus according to claim 1, wherein the gas/liquid injection pipe extends inside of the main tubular part without extending into the subsidiary tubular part which has the inside diameter that is smaller than that of said main tubular part and the outside diameter that is smaller than that of said main tubular part.

* * * * *